Aug. 8, 1967     D. D. STRASSBERG     3,335,422
EVENT RECORDERS EMPLOYING SEMICONDUCTIVE
SWITCHING ELEMENTS
Filed Oct. 3, 1963
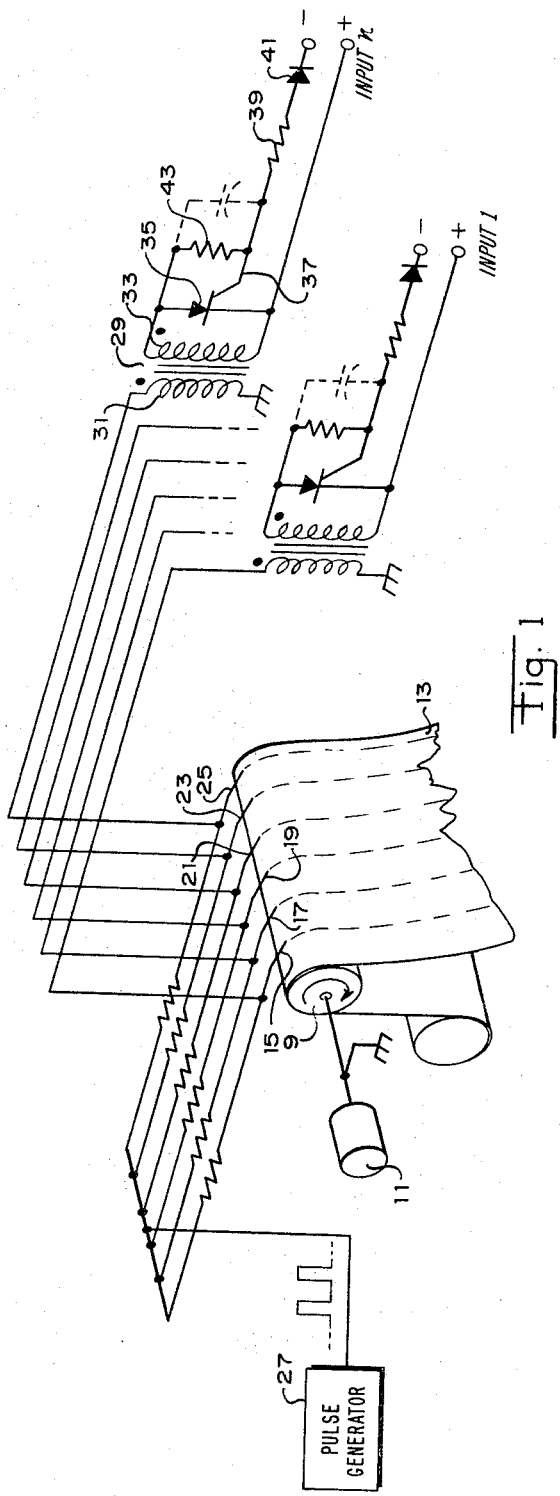
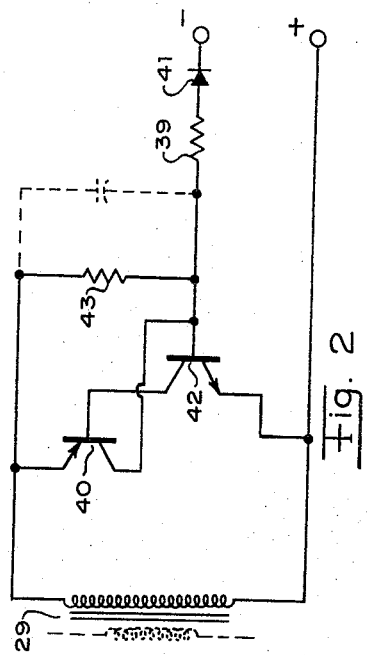
INVENTOR
DANIEL D. STRASSBERG
BY
ATTORNEY

United States Patent Office 3,335,422
Patented Aug. 8, 1967

3,335,422
EVENT RECORDERS EMPLOYING SEMICONDUCTIVE SWITCHING ELEMENTS
Daniel D. Strassberg, Belmont, Mass., assignor to Hewlett-Packard Company, Palo Alto, Calif., a corporation of California
Filed Oct. 3, 1963, Ser. No. 313,699
7 Claims. (Cl. 346—74)

ABSTRACT OF THE DISCLOSURE

A plurality of recording electrodes each has a floating input circuit that is responsive to the recording current in the absence of an input event to be recorded for shunting the flow of recording current away from the recording electrode.

---

This invention relates to event recorders and more particularly to a circuit for isolating the inputs of a plurality of channels from each other and from ground.

An event recorder is a type of strip chart recorder which produces a line record of the duration and relative timing of several events. The inputs to each of the channels of such a recorder are frequently connected to receive signals of varying amplitude with respect to different reference potentials. This requires the channels to operate from isolated input terminals. Conventional event recorders use relays in the input circuits to actuate the recording channel in response to the applied signals. However, circuits of this type require high input power to actuate the relay and are limited in speed of response by the response time of the relay. Other conventional event recorders use amplifier stages in the inputs to minimize the input power requirements. However this destroys the isolation of input terminals because of the requirement of a common power supply for economy to energize each of the amplifiers in the input channels. Further, amplifiers provide phase inversion where a minimum number of stages are employed. This causes a line record to appear undesirably in the absence of the event.

Accordingly, it is an object of the present invention to provide an improved event recorder.

It is another object of the present invention to provide input circuits for the channels of an event recorder which are isolated from each other and from ground reference and which provide line records without phase inversion using negligible input power.

In accordance with the illustrated embodiment of the present invention electrosensitive paper provides the line records of events in response to current applied through electrodes to the paper. Each of the electrodes is connected through a resistor to a common source of pulses. Each of the electrodes is shunted by an input circuit which includes a transformer having a primary winding thereon connected between the electrode and ground. A secondary winding of the transformer is isolated from ground reference and is shunted by a controllable switching device such as a four layer semiconductor. The input terminals of the recording channel are connected to one terminal of the secondary winding of the transformer and to the control electrode of the switching device. In the absence of input or control signal, the switching device is unblocked and is rendered conductive in response to each pulse from the pulse source applied thereto. The primary winding thus presents a low impedance to ground which in turn shunts the pulse current away from the electrode, thereby preventing a line record from being formed. The presence of signal at the input terminals of suitable amplitude and polarity blocks the switching device and prevents it from conducting during a pulse cycle. The primary winding of the transformer thus conducts negligible amounts of the pulse current and substantially all the pulse current flows in the electrode to form a line record.

Other and incidental objects of the present invention will be apparent from a reading of this specification and an inspection of the accompanying drawing in which:

FIGURE 1 shows a pictorial diagram of the recorder of the present invention; and FIGURE 2 shows a typical switching device using a pair of transistors.

Referring now to FIGURE 1 of the drawing, there is shown a roller 9 driven by motor 11 which advances the recording chart 13 at a preselected rate. A plurality of electrodes 15–25 are disposed near the recording chart 13 to supply electrical signal thereto. Each of the electrodes 15–25 is connected through a resistor to a common pulse generator 27. Each of the electrodes 15–25 is shunted by an input circuit, only two of which are shown for clarity. The input circuit includes a transformer 29 having a primary winding 31 which connects the electrode to ground. The secondary winding 33 is shunted by a controllable switching device 35 such as for a four layer semiconductor. The control or gate electrode 37 of the switching device 35 is connected to an input terminal through serially connected resistor 39 and diode 41. The switching device of FIGURE 2 includes a pair of transistors 40 and 42 connected to be heavily conductive in response to pulses applied to the base of transistor 42 through resistor 43. In operation, the pulses from pulse generator 27 applied to electrode 25 of the nth recording channel are shunted to ground by the primary winding 31 of transformer 29. This primary winding presents a relatively low impedance to ground in the absence of signal applied to input N. This is because for the dot polarity of the windings as shown, the switching device 35 is rendered conductive during the pulse period. Resistor 43 connected between the gate electrode 37 and the anode electrode of the switching device 35 supplies a signal of proper polarity to render the switching device highly conductive during the pulse period. As a result, the secondary winding 33 is shorted and hence the primary winding 31 presents a low impedance to ground during the pulse period. This prevents pulse current from passing through electrode 25 to the recording chart 13. Thus, no line record is produced on the electrosensitive recording chart 13 in the absence of signal applied to input terminals N. When signal appears at the input terminals N having a polarity as indicated, the gate electrode 37 blocks the switching device 35, thereby preventing it from becoming heavily conductive during a pulse period. As a result, the primary winding 31 of transformer 29 present high impedance to ground and hence the pulse current in electrode 25 flows in the electrosensitive recording chart 13. This produces a line record on the presence of an event represented by an input signal applied to input terminals N. Each of the remaining signal channels produces a line record in substantially the same manner in response to signals applied to the input terminals of the respective channels. Each channel has its own pair of input terminals, which terminals are isolated from ground and also from each other. This permits each of the several recording channels to be operated from various signal sources without interaction or ground currents. The input power required to actuate a recording channel is negligibly small, the requirement being that power necessary to actuate the gate or control electrode 37. The line record produced by a given recording channel appears as a series of line segments produced at each successive recurrence of a pulse from pulse generator 27. If the repetition rate of pulses from pulse generator 27 is chosen sufficiently high with respect to the paper speed, these line segments appear as a continuous line on the recording chart 13. Resistor 39 is chosen to establish the desired input impedance. Diode 41 increases the level of noise on the input signal which can be tolerated by the circuit without affecting its operation.

Therefore the event recorder of the present invention eliminates the need for a common power supply and provides individual sets of floating input terminals which are isolated from ground and from each other. Each of the recording channels requires negligible input power to actuate the recording channel. Also, a recording channel produces a line record only in the presence of a control signal having sufficient amplitude and correct polarity to actuate the gate or control electrode when applied to the input terminals of the channel. Further, several sets of input terminals, each isolated from the others, may be connected to windings on a transformer of one channel to produce a line record in response to signals at the input terminals attaining predetermined values.

I claim:
1. An event recorder comprising:
   a recording medium for providing a visual indication in regions of the medium where an electrical recording signal is applied;
   an electrode disposed for applying an electrical recording signal to a selected region of said medium to provide a visual indication of an event to be recorded;
   a source of alternating electrical signal, a portion of each cycle of said alternating electrical signal comprising a recording signal;
   a transformer having first and second windings;
   means including said first winding and forming a first signal conduction path;
   circuit means connecting said source to said electrode and to said first signal conduction path;
   a switching device having a second signal conduction path connected across said second winding for controlling the impedance of said first winding and having a control element for controlling the operating state of said device, said device having a first state for increasing the impedance of said first winding to make said recording signal flow through said electrode to form a visual indication on said medium and having a second and more highly conductive state for decreasing the impedance of said first winding to make said recording signal flow through said first signal conduction path to prevent formation of a visual indication on said medium;
   means connecting said second winding to said control element for supplying thereto a control signal related to said recording signal; and
   input means connected to said control element for supplying thereto an input signal related to the event to be recorded, said device being responsive to said control signal in the absence of said input signal for operating in its second and more highly conductive state to prevent formation of a visual indication on said medium and being responsive to application of said input signal to said control element for operating in its first state to provide a visual indication on said medium of the event to be recorded.

2. An event recorder as in claim 1 including means for producing relative motion between said electrode and said medium and wherein said device is a semiconductor device and said circuit means comprises a resistor.

3. An event recorder comprising:
   a recording medium for providing a visual indication in regions of the medium where an electrical recording signal is applied;
   a source of recurring recording signals;
   a plurality of electrodes each disposed for applying an electrical recording signal to a selected region of said medium to provide a visual indication of an event to be recorded; and for each of said electrodes
   a transformer having first and second windings;
   first circuit means including said first winding and forming a first signal conduction path;
   impedance means connecting said source to the electrode and to said first signal conduction path;
   semiconductor means having a second signal conduction path connected across said second winding for controlling the impedance of said first winding and having a control element for controlling the operating state of said semiconductor means, said semiconductor means having a first state for increasing the impedance of said first winding to make a recording signal flow through said electrode to form a visual indication on said medium and having a second and more highly conductive state for decreasing the impedance of said first winding to make a recording signal flow through said first signal conduction path to prevent that recording signal from forming a visual indication on said medium;
   second circuit means connecting said second winding to said control element for supplying thereto a control signal related to a recording signal; and
   input means connected to said control element for supplying thereto an input signal related to an event to be recorded, said semiconductor means being responsive to said control signal in the absence of said input signal for operating in its second and more highly conductive state to prevent formation of a visual indication on said medium and being responsive to application of said input signal to said control element for operating in its first state to provide a visual indication on said medium of the event to be recorded.

4. An event recorder as in claim 3 including a source of reference signal and wherein said first circuit means comprises said first winding and means for serially connecting said first winding between said impedance means and said source of reference signal, said second winding being insulated from said source of reference signal.

5. An event recorder as in claim 4 wherein said input means includes:
   an input terminal for receiving said input signal;
   a unidirectional conducting device; and
   means connecting said unidirectional conducting device between said input terminal and the connection of said second circuit means to said control element.

6. An event recorder as in claim 5 wherein said semiconductor means comprises first and second transistors of opposite conductivity type each having an emitter, a collector, and a base, the collector and emitter of said first transistor being connected in series with the emitter and the base of said second transistor to form said second signal conduction path, the collector of said first transistor and the base of said second transistor being serially connected in said second signal conduction path, and the collector of said second transistor being connected to the base of said first transistor to form said control element.

7. An event recorder as in claim 5 wherein said semiconductor means comprises a four layer diode, said impedance means comprises a resistor, and said second circuit means includes a resistor.

References Cited

UNITED STATES PATENTS 3,142,065   7/1964   Streater _____ 346—74

OTHER REFERENCES

Application Notes—"Silicon Controlled Rectifier," Solid State Products (SSP) Bulletin D420-02-8-59, August 1959, pp. 5 and 6.

BERNARD KONICK, *Primary Examiner.*

J. BREIMAYER, *Assistant Examiner.*